United States Patent
Winter

(10) Patent No.: US 7,761,925 B2
(45) Date of Patent: Jul. 20, 2010

(54) METHOD FOR PROCESSING INFORMATION PARTS OF RECORDED DATA

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1075 days.

(21) Appl. No.: 10/489,933

(22) PCT Filed: Sep. 16, 2002

(86) PCT No.: PCT/EP02/10363

§ 371 (c)(1),
(2), (4) Date: Jul. 14, 2005

(87) PCT Pub. No.: WO02/068574

PCT Pub. Date: Sep. 6, 2002

(65) Prior Publication Data

US 2006/0155987 A1   Jul. 13, 2006

(30) Foreign Application Priority Data

Sep. 18, 2001   (EP) .................................. 01122321

(51) Int. Cl.
  G06F 21/24   (2006.01)
  G06F 17/30   (2006.01)
(52) U.S. Cl. .............................. 726/30; 705/52; 715/229
(58) Field of Classification Search ................. None
  See application file for complete search history.

(56) References Cited

U.S. PATENT DOCUMENTS

| | | | |
|---|---|---|---|
| 5,983,242 A | 11/1999 | Brown et al. ................. 707/203 |
| 6,078,909 A * | 6/2000 | Knutson ....................... 705/59 |
| 6,513,121 B1 * | 1/2003 | Serkowski .................... 726/29 |
| 6,564,232 B1 * | 5/2003 | Cole et al. ................... 707/203 |
| 6,801,929 B1 * | 10/2004 | Donoho et al. .............. 709/204 |
| 7,162,499 B2 * | 1/2007 | Lees et al. ................... 707/203 |
| 7,188,224 B2 * | 3/2007 | Ohta et al. ................... 711/163 |
| 7,197,534 B2 * | 3/2007 | Donoho et al. .............. 709/204 |
| 7,213,155 B2 * | 5/2007 | Sako et al ................... 713/189 |

(Continued)

FOREIGN PATENT DOCUMENTS

EP   757 506 A2   2/1997

(Continued)

OTHER PUBLICATIONS

"Part 5: Converting Files With Different Versions", Nikkei Personal Computing, Apr. 17, 2000, pp. 150-151.

(Continued)

Primary Examiner—Christopher A Revak
(74) Attorney, Agent, or Firm—Robert D. Shedd; Harvey D. Fried; Joel M. Fogelson

(57) ABSTRACT

The method, device and medium according to the invention provide (restricted) forward compatibility to higher device/medium versions. It is provided a defined behavior of an older device, if it has to handle information of a higher version number than supported by itself. A device according to the invention is able to provide restricted (e.g. playback) functionality of its records to older devices. So, a newer device is assured, that older devices will not damage the additionally stored information: This is important, because only a newer device is able to understand these additional information, and to process it correctly.

6 Claims, 3 Drawing Sheets

U.S. PATENT DOCUMENTS

| | | | | |
|---|---|---|---|---|
| 7,302,562 B1 * | 11/2007 | Jacobson et al. | | 713/100 |
| 7,313,704 B2 * | 12/2007 | Kashiwada | | 713/191 |
| 7,313,827 B2 * | 12/2007 | Kelley et al. | | 726/28 |
| 7,367,048 B2 * | 4/2008 | Kelley et al. | | 726/2 |
| 7,428,635 B2 * | 9/2008 | Tchen et al. | | 713/2 |
| 7,441,117 B2 * | 10/2008 | Matsuzaki et al. | | 713/163 |
| 7,457,974 B2 * | 11/2008 | Conley et al. | | 713/322 |
| 2006/0184589 A1 * | 8/2006 | Lees et al. | | 707/201 |
| 2006/0236083 A1 * | 10/2006 | Fritsch et al. | | 713/1 |
| 2006/0236317 A1 * | 10/2006 | Wetherly et al. | | 717/168 |
| 2007/0127377 A1 * | 6/2007 | Brocke et al. | | 370/230 |
| 2007/0166002 A1 * | 7/2007 | Mamidwar et al. | | 386/83 |
| 2007/0214472 A1 * | 9/2007 | Kim et al. | | 725/28 |

FOREIGN PATENT DOCUMENTS

| | | |
|---|---|---|
| EP | 798 866 A2 | 10/1997 |
| EP | 875 898 A2 | 11/1998 |
| JP | 10-83333 A | 3/1998 |

OTHER PUBLICATIONS

Jin Kamikouchi, "For DTP Businessmen: Jin Kamikouchi's Instructions On How To Prevent Troubles In DTP", No. 20, I/O seperate volume, Professional DTP, K.K. Kogakusha, 1st Ed., Jun. 1, 1999, pp. 107-109.

"Illustrator 9.0 for Macintosch MENU MASTER", X-Media Corp., 1st Ed., Sep. 28, 2000, pp. 221-224.

* cited by examiner

METHOD FOR PROCESSING INFORMATION PARTS OF RECORDED DATA

This application claims the benefit under 35 U.S.C. §365 of International Application PCT/EP02/10363 filed Sep. 16, 2002, which claims the benefit of European Patent Application No. 01122321.1 filed Sep. 18, 2001.

FIELD OF THE INVENTION

The invention relates to a method for processing information parts of recorded data, a respective processing device and a respective recording medium. There exist several media on which data to be processed can be recorded, e.g. magnetic tapes or disks, optical tapes or disks, solid state memories etc. For each of such recording media, several standards on how to record and how to organize the data exists.

BACKGROUND OF THE INVENTION

In case of a new standard for processing, e.g. recording, data, or in case of a new upgraded version of such standards, records of recording devices working according to that new standard or version are not readable by recording devices of an older version.

According to some standards version numbers are used to indicate the version of its assigned recorded information. If a device detects information indexed by a higher version number than the version number supported by the device itself, then this device will reject this information, because the device does not know anything about the structure of this information. This has the effect that the device is not able to access to the information and will stop any further processing of the information.

However, it is important to take care of future versions of a standard. If there is taken no care of later versions, then the behaviour of the older devices may be arbitrary in the case of handling version updated information. Arbitrary behaviour of older devices, or such non-existence of forward compatibility is a big disadvantage.

SUMMARY OF THE INVENTION

It is an object of the invention to provide forward compatibility.

This object is solved by the method as described in claim 1.

Recorded data consists of one or several information parts, which may be related to each other. This means that processing of the recorded data in general requires different information parts to be processed, which information parts may refer to each other. Each information part may be changed in order to change or amend the recorded data without changing the other information parts. In case two information parts refer to each other, changing of one of them may necessitate a change of the other in order not to destroy consistency. The rules given by a certain version of a standard take care of such necessities. Processing types are for example generating process, read process, append process, i.e. to add something at a predefined location of the information part, preferably at its end, or edit process, i.e. to change the content of the information part. According to the invention an information part is processed at least by some of the available processing types, even if the available processing types comply to an earlier version of the standard than the information parts. This has the advantage of forward compatibility of an older device for at least some processing types being in conformity with a newer version of a standard. Even an old device can read information parts, which were created by a new device in compliance with a later version of the standard than the version to which the old device complies. However, it is prevented that the old device destroys information that complies to the later version of the standard by not permitting the old device to perform append or edit processing types.

Preferably processing is done according to a version of the standard having a lower version number than the processing version number in case that the information part version number is lower than the processing version number. This assures correct interpretation of the information contained in the processed information part as intended according to the old version of the standard to which the information part complies. Preferably, processing is performed according to the version of the standard identical to the information part version number. However, processing according to a version number higher than that but not higher than the processing version number is done as long as correct interpretation is assured.

Preferably, processing is permitted as long as the processing version number and the information part version number do not differ from each other about more than a predefined value. This assures limited forward control. In case that a future version of this standard cannot be designed such to guarantee compliance of a certain information part with previous versions even for those processing types for which this was possible for previous versions, then the version number of this new version of the standard is chosen such that the difference exceeds said predefined value. This allows, for example, read processing for any version of the standard while append processing might be permitted only for versions n.xx and n+1.xx for a device being in compliance with version n.00. A new version of the standard that would not guarantee compliance for the append process with older devices would, therefore, require a version number n+2.xx.

According to the invention a processed information part is provided with a new information part version number, which indicates the lowest version of the standard to which the processed information part complies before said processed information part is transmitted. This assures correct further processing of the processed information part, even if previous processing has changed some characteristics, and even if these changes are not in conformity with the version of the standard the information part previously was in conformity with. In general this will cause an increase of the information part version number. However, there may also be a decrease of the information part version number in case that during processing, such characteristic have been removed, which made necessary compliance to a higher version of the standard. Transmission is, in this meaning, for example a transmission within the same device or to another device, by wire or wireless. The information part is transmitted for example to be displayed, to be recorded, to be further processed or to be handled in another appropriate way.

Preferably, several information part version numbers are attached to a single information part. This has the advantage that for several processing types different version numbers can be assigned thus increasing flexibility of compatibility design.

A reading and/or recording device for performing the method as described above is also part of this invention.

A recording medium according to the invention comprises information parts, which are generated according to the inventive method or a similar method. Such recording medium comprises information parts that belong to one set of recorded data, these information parts having different information part version numbers although they are related to each other to form, in combination, the recorded data.

The invention is described below in some specific examples, more details can be seen therefrom. However, also other combinations of features are covered by the invention.

BRIEF DESCRIPTION OF THE DRAWINGS

In the figures

Figure 3:
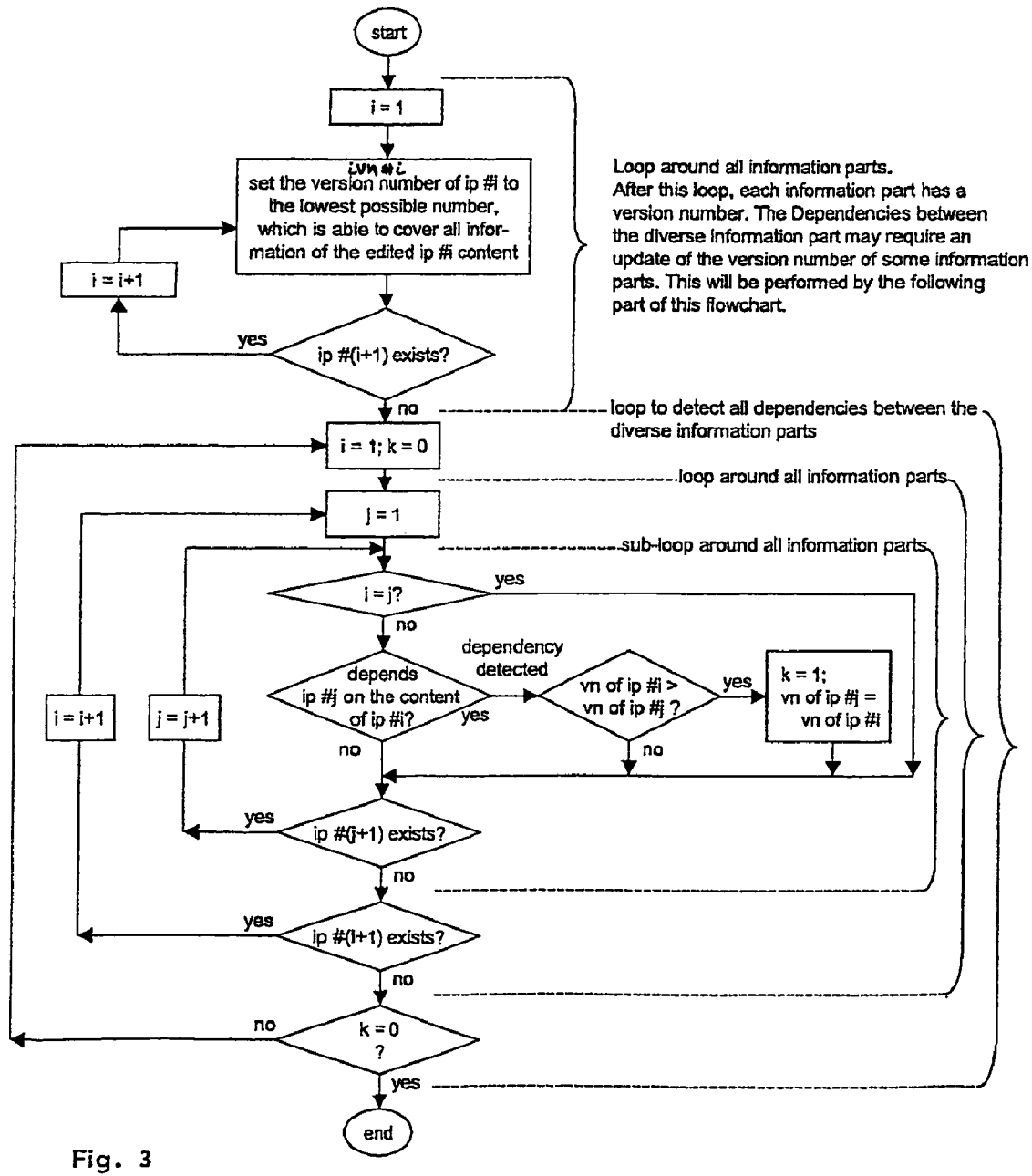

The rectangle "derive lowest version number" is described by FIG. 3.

Figure 2:
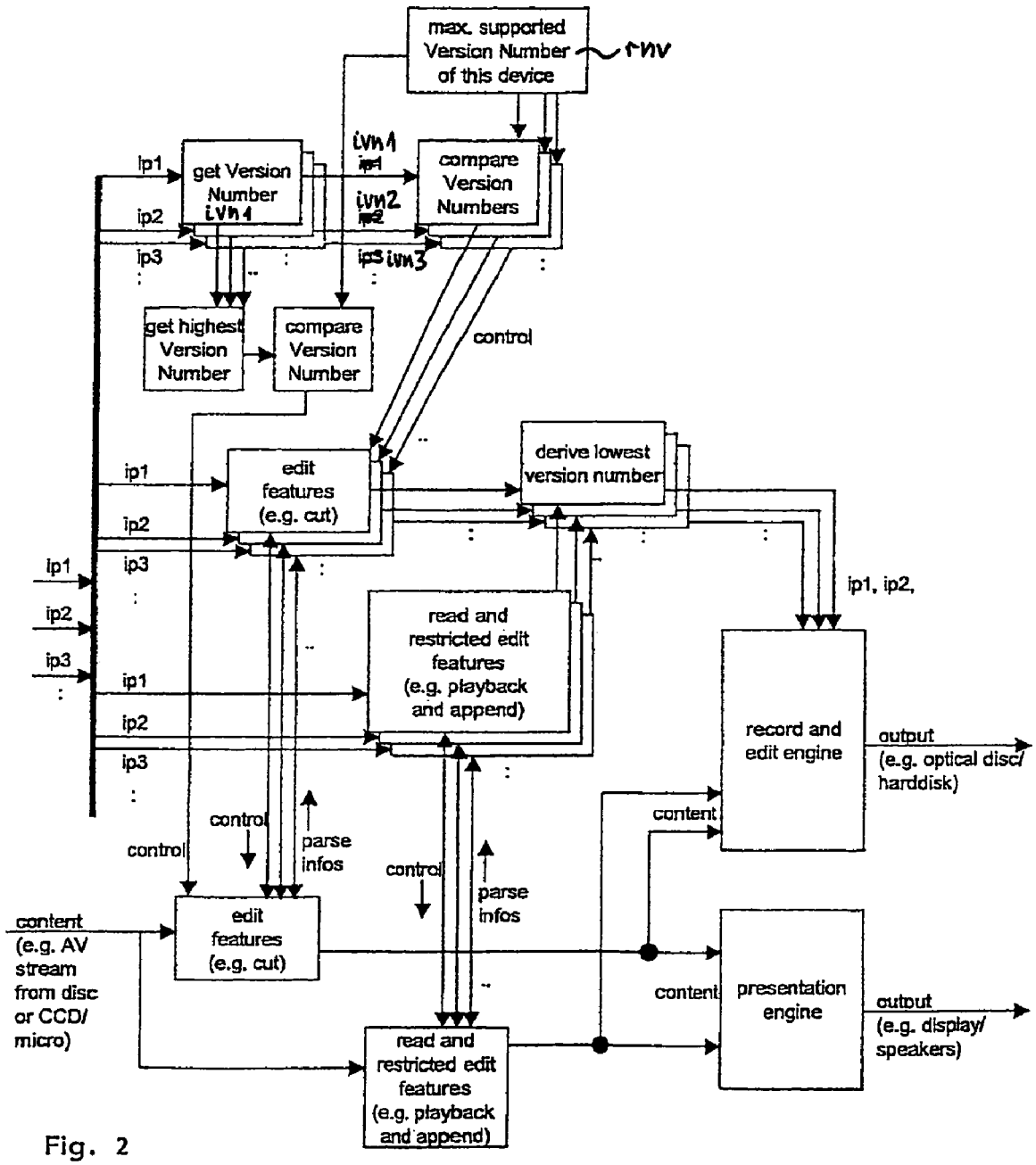
FIG. 2 shows a recording medium according to the invention.

FIG. 3 shows a flowchart of deriving the version number for each information part. This procedure describes the rectangle "derive lowest version number" of FIG. 2. In this flowchart "vn" means version number and "ip" means information part.

DETAILED DESCRIPTION OF THE INVENTION

In the following there is described a definition of a version number, which provides restricted forward compatibility of a device to later versions. This is performed by a special definition of the meaning of the version number. This special definition contains restrictions for later versions. So, the behaviour of later versions follows some rules. These rules guarantee the structure of information covered by information containers, e.g. descriptors, of later versions of a standard.

An information part, e.g. a separated file, shall contain an information part version number inv. This information part version number inv indicates the version of the encoder, which generated this information part. It is to be noted, that the encoding device may be even of a higher version number than this generated version number inv. It is also possible that one device generates different version numbers inv1, inv2, . . . for different information parts ip1, ip2, . . .

If another device shall process such information parts, ip1, ip2, . . . then it has a look for the respective information part version numbers inv1, inv2 . . . . If the version number inv of such an information part is equal or lower than the processing version number rnv supported by the device itself, then full support of all features is provided by the device.

If the version number inv of such an information part ip is higher than the processing version number rnv supported by the device itself, then the device does support only restricted access to the information part ip and assigned data and information. This restricted access means, that the access is for example restricted to only read processing, e.g. playback, for the information part and its assigned data or to read processing and restricted write processing, e.g. append new information and data, of the information part and its assigned data. Restricted write processing means, that a change of the information part or assigned data and information are permitted to be changed in a restricted manner, e.g. to append new data or information, but prohibit a change of already recorded information and data.

In order to support more flexible forward compatibility preferably more than one version number indicator is provided for the same information part ip. For example:

A first version number inv defines the readability, e.g. for playback, of the information part ip for devices of later versions, and a second version number inv of the same information part ip defines the restricted write access for edit processing, e.g. cut and change information and data, and a third version number inv of the same information part ip defines the restricted write access for appending new information and data to the information part ip and its assigned information and data, and a fourth version number indicates the actual version number of the used encoder for generating the information part. This is useful especially for devices of higher version rnv. They use such information for example to automatically correct, or provide workaround(s) for, known bug(s) of this specification or known device bug(s).

The following table describes the behaviour:

| record device version number (rnv) in comparison to the version number of the information part (inv) | read (e.g. play-back) | append (e.g. add a new recording, leave the old records unchanged) | edit (change already recorded records, e.g. delete a record) |
| --- | --- | --- | --- |
| rnv < inv –> old device | yes (1) | yes/no (3) | no (4) |
| rnv = inv | yes | yes | yes |
| rnv > inv –> new device | yes (2) | yes | yes (2) |

The indication "yes" means that the respective processing type is permitted, "no" means that it is not permitted. Some limitations are indicated by (1) to (4), having the following meaning:

(1) But, only the features of the old version will be supported.

(2) The new device has to support the old version of the standard. This is necessary, because even a newer device has to be aware of the old version to be able to interpret the stored information as intended by the old version.

(3) This feature may be supported ("yes") or not ("no") This depends on the level of version number difference and how strong the structure differences between the processing version number rnv of the device and the information part version number inv are.

(4) A change of the information part cannot be supported, because the old device does not know anything about the additional information supported by the new version of standard. A change of the information could lead to inconsistencies inside a certain part of the information part ip, which certain part is only supported by a new device. Therefore, for an old device it is strongly forbidden to change already stored information generated by a newer version of a standard.

Figure 1:
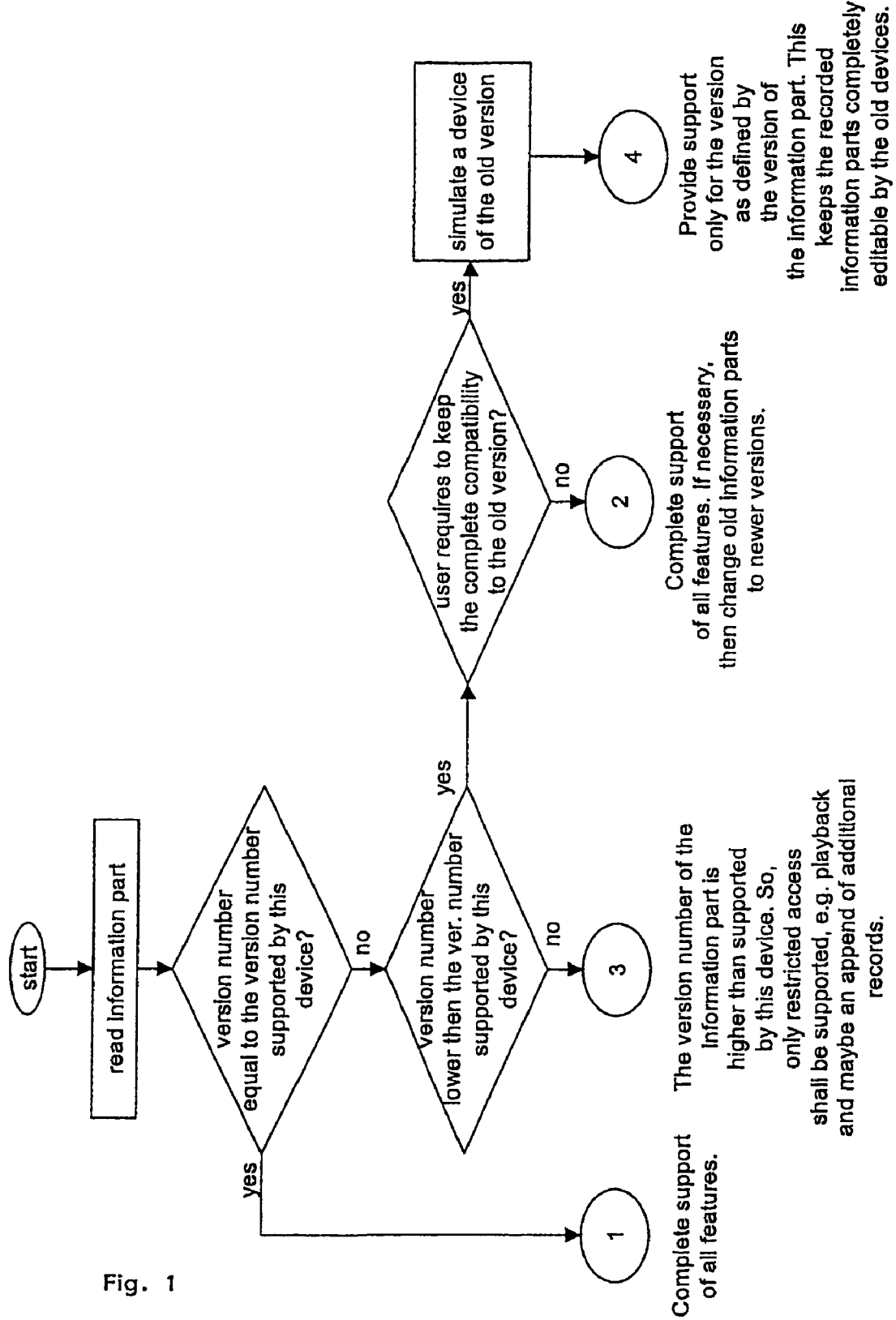
FIG. 1 shows a flowchart of an inventive method.

FIG. 1 shows a flowchart on how to decide which processing types are to be available for a certain information part ip.

If the actual version of the standard defines more than one information part as part of the complete information set, then a device shall, according to the invention, store each information part ip with an as low as useful information part version number in order to provide as much as possible functionality and access to older devices. For example, if a higher version information part number for one information part is necessary to provide voice annotations, but no voice annotations were made for this record, then the information part is stored using the format defined by the old version of the standard.

An example about how information part version numbers inv may change during processing is described as follows:

A device supports exact 4 information parts ip1, ip2, ip3 and ip4, each with an information part version number inv1, inv2, inv3, inv4. The device supports the processing version number inv=3.0 and all previous processing version numbers 1.0, 1.1, 1.2, 2.0.

The history of ip1: launched with version number 1.0, slightly changed for 1.1, not changed to 1.2, slightly changed to 2.0, not changed to 3.0.

The history of ip2: launched with version number 1.0, not changed until inclusively 3.0.

The history of ip3: launched with version number 2.0, expanded to support optional additional information (only voice annotations are added to this version of the standard) slightly changed for version number 3.0.

The history of ip4: launched with version number 3.0. It contains links to the content of ip1. A change of ip1 content requires a change of ip4 information. The recording of ip4 is optional. It shall be recorded for the case that additional metadata about the record has been received (during the recording).

Example Scenario Number 1:

The record device (of version 3.0) makes a record. No voice annotations are done and no additional metadata are received.

The used version numbers are described by the used version numbers of the 4 information parts:

ip1: 2.0, because, there is no difference between ip1 of version 3.0 and ip1 of version 3.0, and no ip4 is recorded.
ip2: 1.0, because ip2 of version 1.0 and 3.0 are the same and there is no version dependent relation to other information parts.
ip3: 2.0, because no voice annotations are done, therefore version 3.0 for ip3 is not necessary
ip4: not recorded, because additional metadata were not recorded.

Example Scenario Number 2:

Start point: Result of scenario 1 (the previous scenario). Now, the user performs (offline) a voice annotation. The used version numbers are described by the used version numbers of the 4 information parts:

ip1: 2.0 no need for a change.
ip2: 1.0, no need for a change.
ip3: 3.0, because only this version supports voice annotations.
ip4: not recorded, because additional metadata were not recorded.

Example Scenario Number 3:

Start point: Result of scenario 2 (the previous scenario). Now, the user receives additional metadata for its records (e.g. via internet). The used version numbers are described by the used version numbers of the 4 information parts:

ip1: 3.0 Now, ip4 was recorded: A change of ip1 would lead to inconsistencies related to the content of ip4. Therefore, only a device of version 3.0 would be able to perform a change of ip1 as necessary to keep the consistency of all information parts.
ip2: 1.0, no need for a change.
ip3: 3.0, no need for a change.
ip4: 3.0, because this is the place for the additional metadata. Because the (new) existence of this information part, ip1 must be of version 3.0 to indicate that an older device shall not edit (e.g. cut or delete) data inside ip1, because this could lead to inconsistencies between ip1 and ip4.

After the third scenario, a device of e.g. version 2.0 would be able to use ip1, ip2 and ip3 for playback and would be able to append new records and this device would be able to edit ip2 because ip2 is still marked as version 1.0. But, it is not allowed for the device to edit ip1, ip2 or even ip4. Of course, the existence of ip4 is not known by a device of version 2.0.

Example Scenario Number 4:

Start point: Result of scenario 3 (the previous scenario). Now, the user removes ip4. The used version numbers are described by the used version numbers of the remaining 3 information parts:

ip1: 1.0 (now, ip4 was removed: A change of only ip1 wouldn't lead anymore to any inconsistencies between the remaining information parts. Therefore, a version 1.0 device may perform a change of ip1 if desired).
ip2: 1.0, (no need for a change).
ip3: 3.0, (no need for a change).
ip4: was removed It is recommended to assign automatically the highest version number used by any of the stored information parts for the recorded data, e.g. streams, which shall be controlled by the information parts. That means, that an older device will not edit the recorded data. That keeps the consistency of the recorded data with the (newer) information parts. It is strongly recommended to implement this rule as part of the specification.

In the case of recording, the following restriction for generating the version numbers should apply:

A format version (described by the version number) shall be used which covers all required properties (e.g. features) for this information part and the version number of the information part shall be as low as possible (in order to provide as much compatibility to older devices as possible) and in the case of related information parts exist the version number shall be chosen in a way (high enough), that the version number requires an editing device, which exactly knows about the complete dependencies to the related information parts (in order to avoid inconsistencies between (however) linked information parts after editing of the information part by an older device).

The method, device and medium according to the invention provide (restricted) forward compatibility to higher device/medium versions. It is provided a defined behaviour of an older device, if it has to handle information of a higher version number than supported by itself. A device according to the invention is able to provide restricted (e.g. playback) functionality of its records to older devices. So, a newer device is assured, that older devices will not damage the additionally stored information: This is important, because only a newer device is able to understand these additional information, and to process it correctly.

The inventive concept is useable for nearly any kind of (future) technical specification or standard. This invention describes a definition of a version number, which provides restricted forward compatibility of a device to later versions. This is performed by a special definition of the meaning of the version number. This special definition contains restrictions for later version. So, the behaviour of later version follows some rules. These rules guarantee the structure of information covered by information containers (e.g. descriptors) of later specification versions. Of course, these rules should be defined in all versions of the same standard. If there is one version according to which these rules are not required, it is probably not possible to guarantee forward compatibility for this version and all previous versions.

What is claimed is:

1. Method for processing information parts of recorded data recorded on a recording medium wherein each information part is provided with an information part version number, said information part version number indicating the version of a standard to which the information part complies, each information part may have a different version number, and processing being performed in compliance with a version of said standard being indicated by a processing version number, for processing different processing types being available, the method comprising the steps of reading, from the recording medium, the information part version number of an information part, comparing the read information part version number with the processing version number, if the read information part version number is lower than or equal to the processing version number, permitting every processing type to be performed, else if the read information part version number is higher than the processing version number, permitting only the following processing types to be performed:

reading the information part but not appending or editing the information part thereby preventing destruction of an information part that complies with a version of the standard having the information part version number, but does not comply with a version of the standard having the processing version number, or editing the information part and providing the information part with a new information part version number, wherein the information part version number is decreased in case that during processing an information part has been removed, which makes compliance to a version of the standard having the information part version number necessary, processing the information part using said allowed processing types, and recording the processed information part on the recording medium.

2. Method according to claim 1, wherein performing processing for at least one information part according to a version of the standard having a lower version number than the processing version number if the read information part version number is lower than the processing version number.

3. Method according to claim 1, wherein permitting a processing type to be performed in case the information part version number and the processing version number being different but this difference not exceeding a predefined value.

4. Method according to claim 1, wherein, after processing, providing a processed information part with a new information part version number, said information part version number indicating the lowest version of the standard to which the processed information part complies, transmitting said processed information part.

5. Method according to claim 1, wherein providing different kinds of information part version numbers to a single information part for different kinds of processing types.

6. Reading and/or recording device for performing the method of claim 1.

* * * * *